[12] United States Patent
Wang

(10) Patent No.: US 12,169,162 B2
(45) Date of Patent: Dec. 17, 2024

(54) PELVIS MEMBER OF AN ANTHROPOMORPHIC TEST DEVICE HAVING A BUTTOCK CAVITY TO SIMULATE BUTTOCK COMPRESSION

(71) Applicant: Humanetics Innovative Solutions, Inc., Farmington Hills, MI (US)

(72) Inventor: Zhenwen Jerry Wang, Farmington Hills, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 331 days.

(21) Appl. No.: 17/708,052

(22) Filed: Mar. 30, 2022

(65) Prior Publication Data

US 2022/0326120 A1 Oct. 13, 2022

Related U.S. Application Data

(60) Provisional application No. 63/171,857, filed on Apr. 7, 2021.

(51) Int. Cl.
*G01M 99/00* (2011.01)
*G09B 23/30* (2006.01)
*A47F 8/00* (2006.01)

(52) U.S. Cl.
CPC .......... *G01M 99/001* (2013.01); *G09B 23/30* (2013.01); *A47F 8/00* (2013.01)

(58) Field of Classification Search
CPC .................................................. G01M 99/001

USPC ....................................................... 73/866.4
See application file for complete search history.

(56) References Cited

U.S. PATENT DOCUMENTS

2014/0162232 A1  6/2014  Yang et al.

FOREIGN PATENT DOCUMENTS

CN  108648591 A  10/2018
EP  3779928 A2  2/2021

OTHER PUBLICATIONS

English language abstract for CN 108648591 A extracted from espacenet.com database on Aug. 24, 2022, 1 page.
European Search Report for Application EP 22 16 6508 dated Aug. 12, 2022, 2 pages.

*Primary Examiner* — Alexander A Mercado
*Assistant Examiner* — Rodney T Frank
(74) *Attorney, Agent, or Firm* — Howard & Howard Attorneys PLLC

(57) ABSTRACT

An anthropomorphic test device includes a pelvis member. The pelvis member has a foam core and includes an abdomen region defining a first cavity and a pair of thigh regions extending from the abdomen region. The pelvis member also includes a buttock region positioned below the abdomen region and rearward of the pair of thigh regions. The buttock region defines a buttock cavity separate from the first cavity with the buttock region also defining at least one vent port. The buttock cavity compresses from an open condition to a collapsed condition when the anthropomorphic test device is placed onto a surface for approximating a force applied by a body weight of a human.

21 Claims, 9 Drawing Sheets

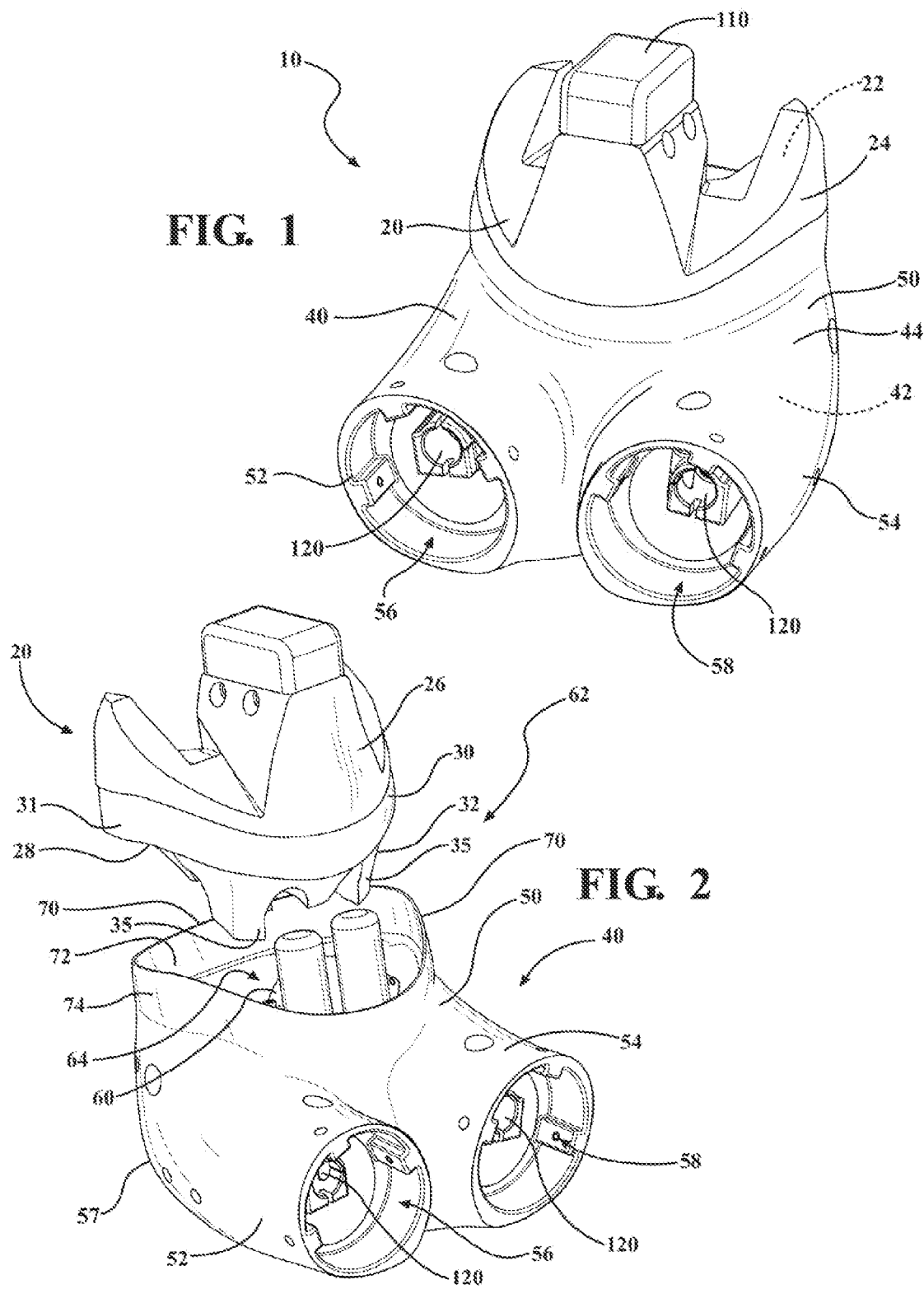

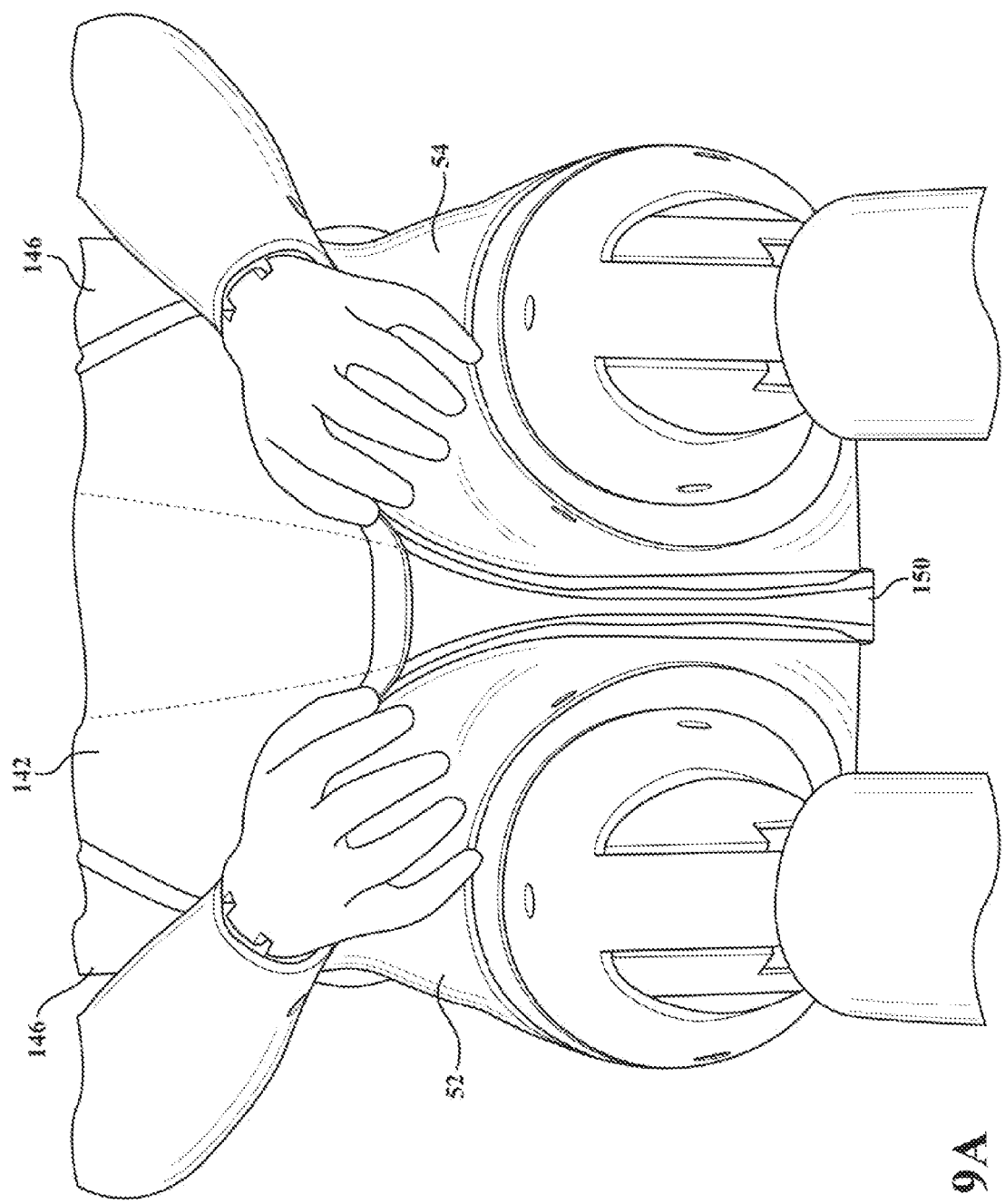

PELVIS MEMBER OF AN ANTHROPOMORPHIC TEST DEVICE HAVING A BUTTOCK CAVITY TO SIMULATE BUTTOCK COMPRESSION

CROSS REFERENCE TO RELATED APPLICATIONS

The present disclosure claims priority from U.S. Provisional App. Ser. No. 63/171,857, filed Apr. 15, 2021, the entirety of which is herein incorporated by reference.

BACKGROUND OF THE INVENTION

1. Field of the Invention

The present invention relates generally to anthropomorphic test devices and, more particularly, to a pelvis member of an anthropomorphic test device having a buttock cavity that simulates buttock compression when placed on a surface that approximates a force applied by a body weight of a human when placed on the surface.

2. Description of the Related Art

Automotive, aviation, and other vehicle manufacturers conduct a wide variety of collision testing to measure the effects of a collision on a vehicle and its occupants. Through collision testing, sometimes otherwise referred to as crash testing, a vehicle manufacturer gains valuable information that can be used to improve the vehicle for better occupant protection.

Collision testing often involves the use of anthropomorphic test device ("ATD"), sometimes alternatively referred to as anthropomorphic mannequins, and better known as "crash test dummies", to estimate a human's injury risk. The anthropomorphic test device typically includes a head assembly, spine assembly, rib cage assembly, pelvis assembly, right and left arm assemblies, and right and left leg assemblies. Joints are provided to couple various assemblies together and to allow articulation that simulates the human range of motion. In addition, these assemblies are typically covered with a simulated flesh that includes an inner foam material covered with a skin. The anthropomorphic test device must possess the general mechanical properties, masses, joints, and joint stiffness of the humans of interest. In addition, the ATD must possess sufficient mechanical impact response to cause them to interact with the vehicle's interior in a human-like manner during the collision testing.

In the pelvis assembly region of ATDs, during collision testing, it is desirable to have a proper pelvis assembly compression that replicates the seat height of an occupant in a vehicle, especially the hip joint height of the occupant relative to the vehicle seat. In particular, the hip joint height can influence a seat belt route that affects the ATD kinematics and submarining response of the pelvis, especially in reclined seating postures, which is popular with further autonomous vehicles ("AV"s).

In most current designs, different materials such as foams have been used to soften the pelvis flesh stiffness of the pelvis member of the pelvis assembly in an attempt to achieve a proper buttock compression of the pelvis assembly via the pelvis member in the ATD design. However, a proper buttock compression of the pelvis assembly via the pelvis member to simulate a human response has not been achieved, even with the use of low density foams.

The present invention addresses and minimizes or overcomes the compression issues associated with the prior art designs and provides therefore an anthropomorphic test device having a more human-like response during collision testing.

SUMMARY OF THE INVENTION

The present invention provides an anthropomorphic test device that includes a pelvis member. The pelvis member has a foam core and includes an abdomen region defining a first cavity and a pair of thigh regions extending from the abdomen region. The pelvis member also includes a buttock region positioned below the abdomen region and rearward of the pair of thigh regions. The buttock region defines a buttock cavity separate from the first cavity with the buttock region also defining at least one vent port. The anthropomorphic test device also includes a structural member positioned within the first cavity. The buttock cavity compresses from an open condition to a collapsed condition when the anthropomorphic test device is placed onto a surface for approximating a force applied by a body weight of a human.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of one embodiment of a portion of an anthropomorphic test device in accordance with the present invention including an abdomen component coupled to a pelvis member and including a resilient flange coupled to the pelvis member.

FIG. 2 is a front perspective view of the abdomen component uncoupled from the pelvis member of FIG. 1.

FIG. 9A is a front view of an additional portion of an anthropomorphic test device in a seated position that includes abdomen component and pelvis member of FIG. 1 and also includes a jacket having a strap coupled to anthropomorphic device.

DESCRIPTION OF THE PREFERRED EMBODIMENT(S)

Figure 3:
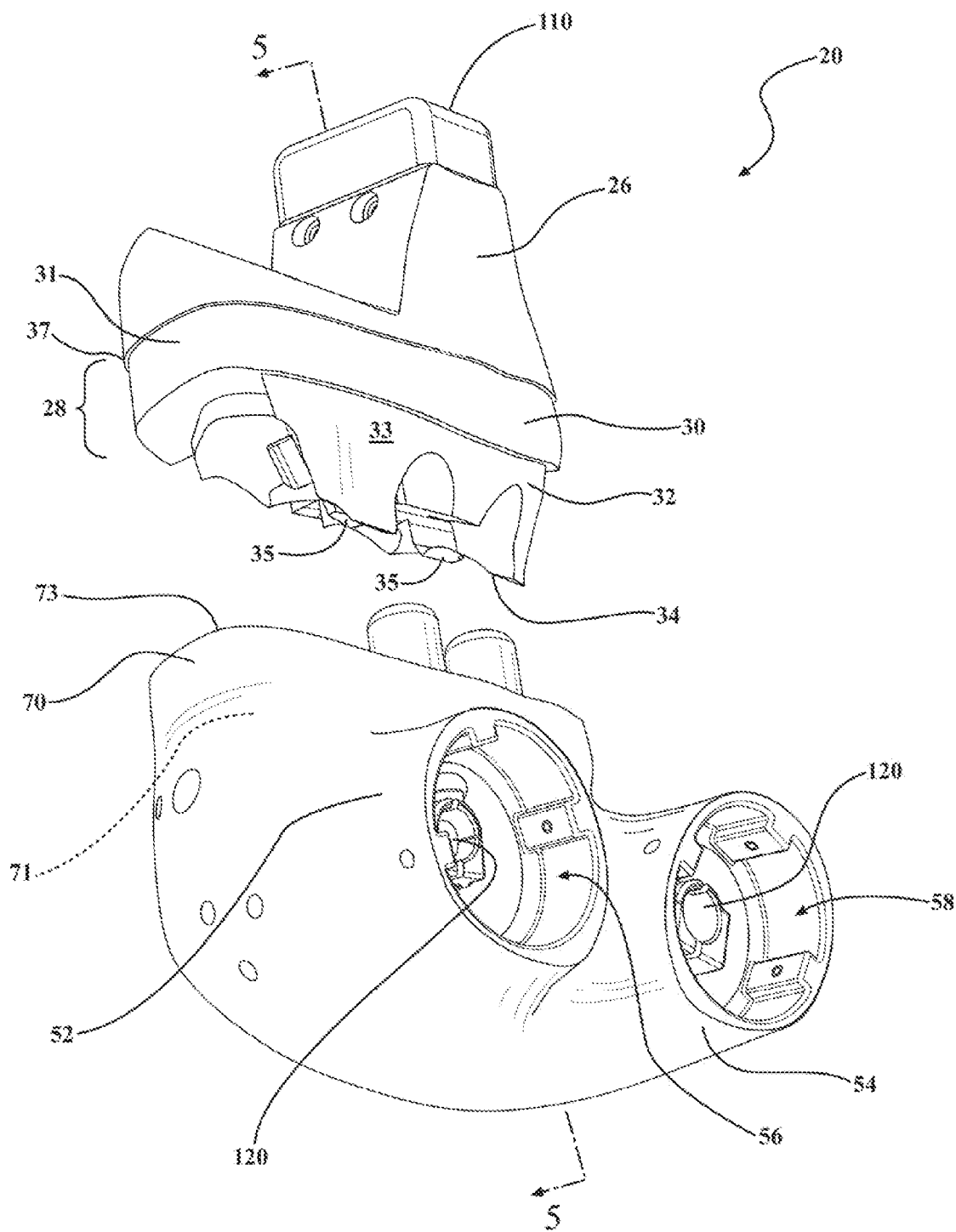
FIG. 3 is a rotated perspective view of FIG. 2.

Referring to FIGS. 1-4 and 6-9, embodiments of a portion of an anthropomorphic test device, or crash test dummy, in accordance with the subject invention is generally indicated at 10 and includes an abdomen component 20 coupled to a pelvis member 40. The embodiments also preferably include a resilient flange 70 that is coupled to and extends from the pelvis member 40. The abdomen component 20, pelvis member 40 and resilient flange 70 are positioned on the anthropomorphic test device 10 in the embodiments herein in a position generally corresponding to the abdominal and abdomen region of the anthropomorphic test device 10. FIG. 5 is also illustrated as an additional view of an anthropomorphic device in accordance with the prior art and does not include a buttock cavity 47 that is included in the embodiment of FIGS. 1-4 and 6-9, described further below.

The terms "anthropomorphic test device" or "crash test dummy" or "ATD" are used interchangeably in the present disclosure. The anthropomorphic test device 10 illustrated in the FIGS. is of a fiftieth percentile (50%) male type and is illustrated in a sitting position. This anthropomorphic test device 10 is used primarily to test the performance of automotive interiors and restraint systems for adult front and rear seat occupants. The size and weight of the anthropomorphic test device 10 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

The abdomen component 20 includes a foam core 22 that is typically covered with a skin 24. The abdomen component 20 allows for the inclusion of a structural member 110, which fills a gap generated between the rib cage and the abdomen when seating the ATD 10 in a reclined posture.

The abdomen component 20 includes an upper portion 26 that is configured to be positioned between beneath a rib cage assembly (not shown) and a lower portion 28 that is configured to be received within the pelvis member 40.

The lower portion 28 of the abdomen component 20 includes a first portion 32 and a second portion 30. The second portion 30, here shown as an upper band region 30, is positioned adjacent to and extends away from the upper portion 26 towards the first portion 30. The outer surface 31 of the second portion 32 has a length defined between the first portion 32 and the upper portion 26. An edge defining a notch 37 extends transversely to and connects the second portion 30 to the upper portion 26.

The first portion 32 extends from the second portion 30 in a direction opposite the upper portion 26 and terminates into a bottom region 34. The outer surface 33 of the first portion 32 extends inwardly relative to the outer surface 31 of the second portion 31 and terminates into a bottom region 34. The bottom region 34 may include one or more projection regions 35.

The maximum width of the first portion 32 of the abdomen component 20 is less than the maximum width of the second portion 30. The maximum width of the first portion 32 refers to a distance measurement between the outer surfaces 33 of the first portion 32 of the abdomen component 20, while the maximum width of the second portion 30 refers to a distance measurement between the outer surfaces 31 of the second portion 32 of the abdomen component 20 along any one cross-sectional view of the abdomen member, which the line defining each of the respective widths being parallel to one another. It can be appreciated that by changing the plane of the cross-sectional view of the abdomen component, additional maximum widths can be obtained. If enough different cross-sectional views of the abdomen component are obtained, the plurality of obtained maximum widths can define a respective circumference for each of the first portion 32 and second portion 30 of the abdomen component 20. Notably, because the maximum width of the first portion 32 of the abdomen component 20 is less than the maximum width of the second portion 30, the corresponding circumference of the first portion 32 of the abdomen component 20 is also less than the corresponding circumference of the second portion 30.

The pelvis member 40, like the abdomen component 20, includes a foam core 42 that is typically covered with a skin 44. The skin 44 may envelop the foam core 42, and thus the skin 44 defines a foam-containing cavity portion 45 (i.e., an inner cavity portion 45) that contains the foam core 42.

The pelvis member 40 includes an abdomen region 50 and a pair of thigh regions 52, 54 extending from the abdomen region 50. The pelvis member 40 also includes a buttock region 57 positioned below the abdomen region 50 and rearward of each of the thigh regions 52, 54 (see FIG. 7A which illustrates schematically with brackets each of the regions 50, 52, 54, and 57). When the anthropomorphic test device 10 is positioned onto a surface 300, the skin 44 of the buttock region 57 of the pelvis member 40 is positioned adjacent to and preferably in contact with surface 300. While the surface 300 illustrated in FIGS. 6-7 is the surface of sled buck used in the evaluation of anthropomorphic test devices 10 during certain collision test, the pelvis member 40 may be positioned onto any other kind of surface 300 that is used in the evaluation of anthropomorphic test devices 10, such as a vehicle seat, a seat, a floor, or any other kind of structure having a surface 300 that is capable of receiving the anthropomorphic test device 10 placed thereon. As used hereinafter, the surface 300 may refer to any of the kinds of surfaces described above, and in particular to surfaces 300 wherein the anthropomorphic test device 10 is placed (such as seated) for subsequent testing such as collision testing.

As will be described in further detail below in FIGS. 6 and 7, the buttock region 57 defines a buttock cavity 47 that is capable of being compressed/collapsed (i.e., simulated buttock compression) to approximate the force applied with the body weight of a human seated upon the surface 300 prior to collision testing, which allows the anthropomorphic test device 10 to more closely simulates the performance of the pelvis member of a human during impact conditions associated with a crash such as a crash while seated on a vehicle seat of a vehicle such as a car. More in particular, the foam core 42 of the buttock region 57 defines, or partially defines in conjunction with the skin 44, the buttock cavity 47 as described above.

The abdomen region 50 is open and includes a base inner surface 60 defining an opening 62 and defining an inner cavity 64, or first cavity 64, with the inner surface 60 contoured to correspond to the shape of the first portion 32 of the abdomen component 20. The base inner surface 62 near the bottom of the first cavity 64 thus includes one or more surface depressions 65, with each of the one or more surface depressions 65 configured to receive a corresponding one of the one or more projection regions 35 when the abdomen component 20 is received within the first cavity 64, as will be described further below.

The first cavity 64 allows for the inclusion of a support member 111, here shown as pelvis support member 111, that is intended to simulate the lower portion of a human spine to support the abdomen from below. Notably, the first cavity 64 is distinct and separate from the buttock cavity 47 (i.e., they are not fluidically connected). The support member 111, in certain instances, may be coupled to a further support structure 120 (i.e., an additional support structure 120), shown in FIGS. 1-3 as pair of thigh support structures 120.

An inner surface of the skin 44 of the thigh regions 52, 54 defines respective openings 56, 58 configured to receive additional members associated with the legs of the crash dummy 10, including the lower thigh members (not shown), and accommodates the additional structural members 120 that extend from and are positioned adjacent to or coupled to the structural member 111. The openings 56, 58 extend in a direction towards the abdomen region 50 and are fluidically coupled with the first cavity 64. Accordingly, in addition to the first cavity 64, the openings 56, 58 are also distinct and separate from the buttock cavity 47.

The anthropomorphic test device 10 also includes a resilient flange 70 which is coupled to the pelvis member 40. The resilient flange 70 includes a flange inner surface 72 and an opposing flange outer surface 74, with a peripheral edge 71 of the resilient flange 70 opposite the pelvis member 40 connecting the flange inner and outer surface, with the flange inner surface 72 further defining the opening 62 and additionally defining a second cavity 79. The second cavity 79 is in open communication with the first cavity 64 of the pelvis member 40. The flange inner surface 72 is sized and shaped to generally correspond to the size and shape of the outer surface 31 of the upper band region 30 of the abdomen component 20. The thickness of the resilient flange 70, as measured between the flange inner surface 72 and the flange outer surface 74 (i.e., the length of the peripheral edge 71), is thin, ranging generally from 3 to 10 millimeters, and more preferably from 3 to 5 millimeters, to provide the resilient flange 70 with flexibility such that it can resiliently be retained against the second portion 30 of the abdomen component 20, as will be described further below. Preferably, the thickness of the resilient flange 70 corresponds to the transverse length of the notch 37.

The resilient flange 70 also can be defined by a maximum width. The maximum width of the resilient flange 70, and preferably the flange inner surface 72, is defined prior to the second portion 30 of the abdomen component 20 being contained within the second cavity 79 and thus represents the maximum width of the flange inner surface 72 in the natural, or unstretched state. As shown, herein, the maximum width of the resilient flange 70 is less than the maximum width of the second portion 30 of the abdomen member 20 but is greater than the maximum width of the first portion 32 of the abdomen member 20.

In certain embodiments, the resilient flange 70 is integrally formed with the pelvis member 40, while in alternative embodiments the resilient flange 70 is a separate structure that is coupled to, or otherwise secured or affixed to, the pelvis member 40. Like the abdomen component 20 and pelvis member 40, the resilient flange 70 includes a skin 73. However, unlike the abdomen component 20 and pelvis member 40, the resilient flange 70 does not include a foam core contained within the skin 73. The skin 73 may be formed from a single material or combination of materials that has the desired flexibility and/or elasticity and strength to perform its desired function, as described further below.

In certain embodiments, the resilient flange 70 extends from, or is otherwise integrally formed with the skin 44 of the pelvis member 40 and has a length terminating at the peripheral edge 71. Accordingly, in these embodiments, the skin 73 may be an extension (i.e., is integrally formed with) of the skin 44 of the pelvis member 40 while in alternative embodiments the skin 73 is coupled to, affixed, or otherwise secured to and thus extends from the skin 44.

Preferably, the length of the resilient flange 70, from the pelvis member 40 to the peripheral edge 71, is substantially like, or the same as, as the length of the second portion 30 of the abdomen component 20. Further, the thickness of the skin 73 of the resilient flange 70, may be the same or different as to the thickness of the skin 44, and may range from 3 to 10 millimeters, and more preferably ranges from 3 to 5 millimeters.

When the abdomen component 20 is coupled to the pelvis member 40, as shown in FIGS. 1 and 5-7, the second portion 32 of the abdomen component 20 is inserted within the opening 62 such that the abdomen component 20 is partially contained within the first cavity 64 and the second cavity 79 such that the outer surface 33 of the first portion 32 of the abdomen component 20 is engaged with the base inner surface 62. In addition, the outer surface 31 of the second portion 30 of the abdomen component 20 is directly engaged with the outer surface 31 of the second portion 30, and thus the abdomen component 20 is resiliently retained by the resilient flange 70. Further, the peripheral edge 71 or the resilient flange 70 abuts the notch 37, and thus the flange outer surface 74 transitions smoothly into the outer surface of the upper portion 26.

Still further, each respective one of the projection regions 35 is seated within a corresponding one of the one or more surface depressions 65. Even still further, the structural member 110 disposed within the abdomen component 20 is coupled to another structural member 111 contained in the first cavity 64 of the pelvis member 40.

As the abdomen component 20 is being coupled to the pelvis member 40, the first portion 32 of the abdomen component freely extends through the opening 62 and second cavity 79 and into the first cavity 64 because the maximum width of the first portion 32 is less than the maximum width of the resilient flange 70. As the abdomen component 20 moves closer to the one or more surface depressions 65, the second portion 30 of the abdomen component 20 contacts the flange inner surface 72 and begins to apply force to the flange inner surface 72 to stretch the skin 73 in a direction outwardly from the second cavity 79 and towards the flange outer surface 74. This application of force increases the width of the resilient flange 70 beyond its maximum width to a width slightly greater than the maximum width of the second portion 30 of the abdomen component 20, thus allowing the second portion 30 of the abdomen component to be fully received in the second cavity 79 with the outer surface 31 of the second portion 30 of the abdomen component 20 positioned into direct engagement with the flange inner surface 72. Once the abdomen component is fully seated such that the one of the projection regions 35 are seated within a corresponding one of the one or more surface depressions 65 and such that the peripheral edge 71 abuts the notch 37, the resiliency of the skin 73 retains the flange inner surface 72 of the resilient flange in direct engagement with the outer surface 31 of the second portion 30. This direct engagement is sufficiently strong to retain the pelvis member 40 in the coupled state with the abdomen component 20.

In this arrangement, the resilient flange 70 aids in initially positioning and maintaining the positioning of the abdomen component 20, preferably by being resiliently retained against the outer surface 31 of the second portion 30, within the cavity 64 of the pelvis member 40 prior to any collision testing. In addition, the resilient flange 70 aids in minimizing or preventing separation issues between the abdomen component 20 and the pelvis member 40 that may occur during collision testing by virtue of its resilient retention features, as compared with arrangements wherein the resilient flange 70 is not present.

Figure 6A:
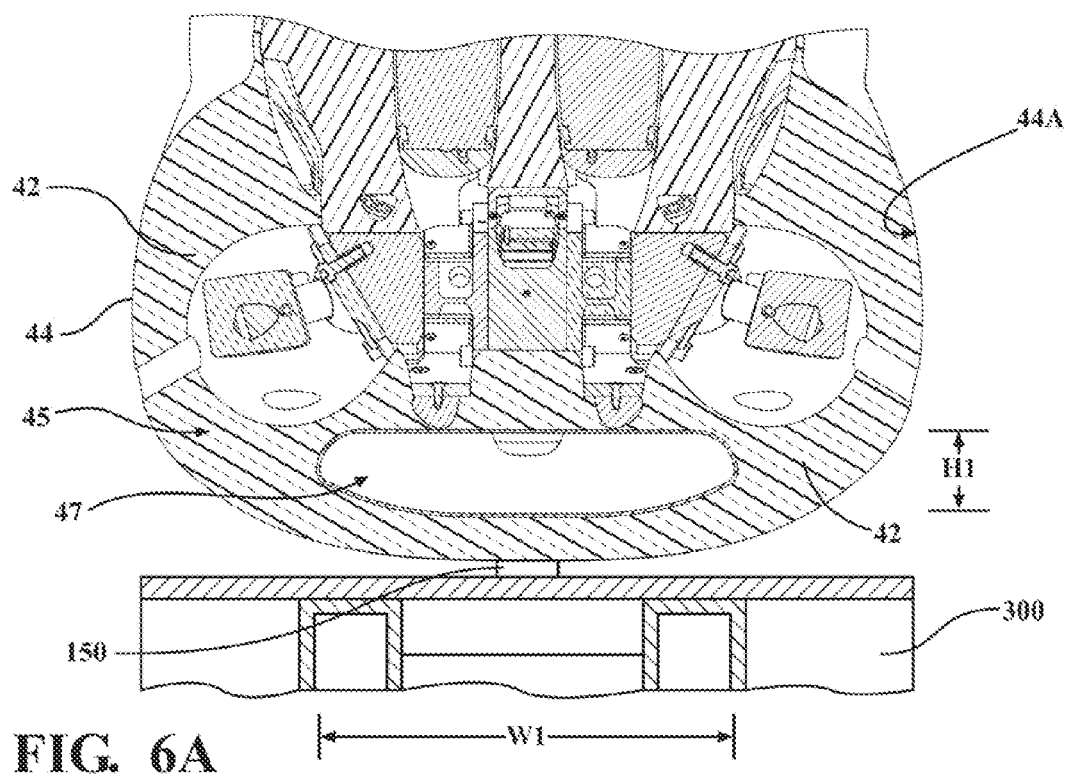
FIG. 6A is a sectional view of FIG. 3 taken along line 4-4 in accordance with an exemplary embodiment of the present invention including a buttock cavity contained within the pelvis member and with the pelvis member in an uncompressed state prior to the anthropomorphic test device being seated onto surface.
Figure 6B:
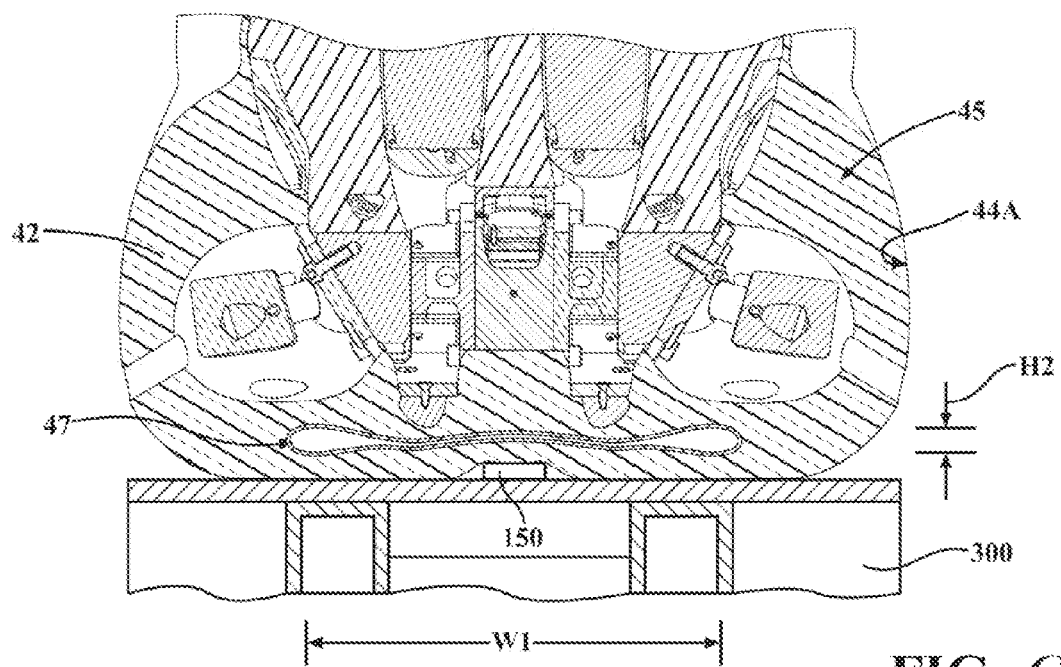
FIG. 6B is a sectional view of the pelvis member of FIG. 6A in a compressed state after the anthropomorphic test device is seated onto a surface.
Figure 7A:
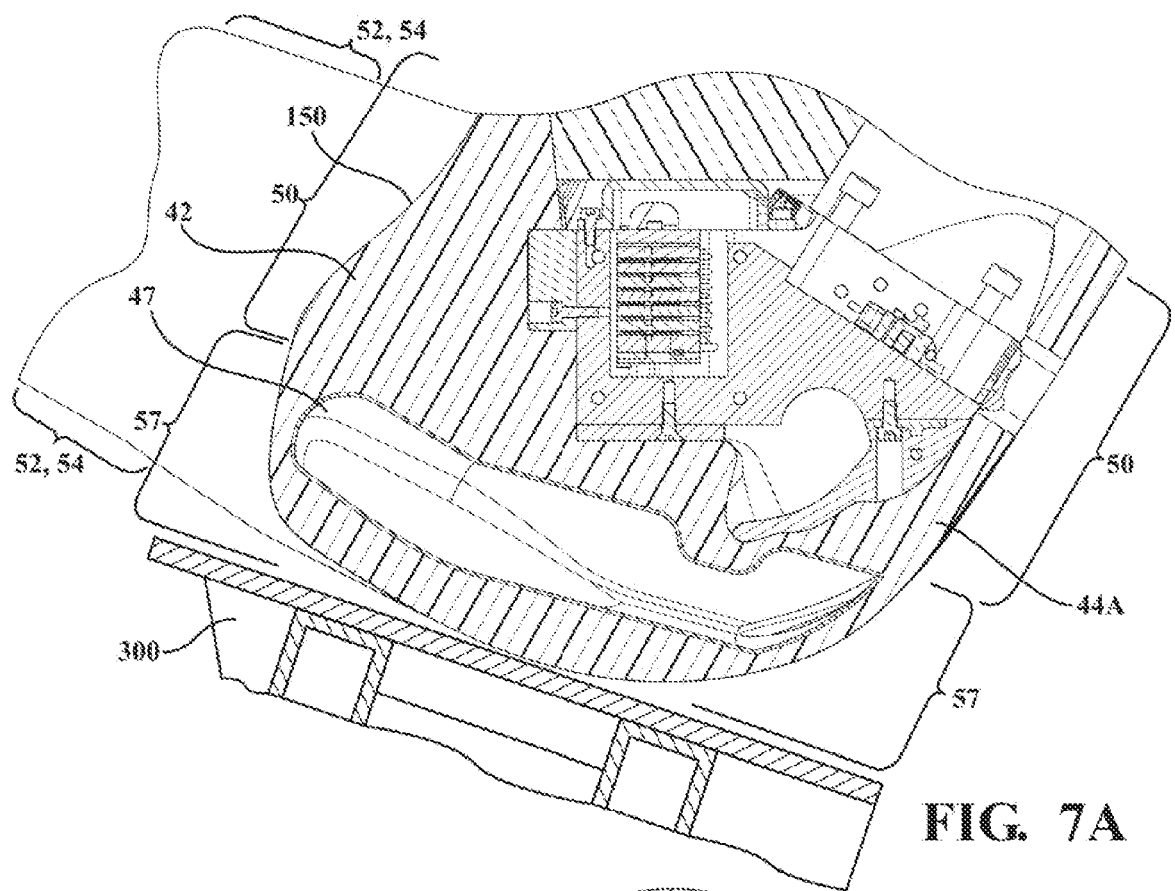
FIG. 7A is a side sectional view of FIG. 6A.
Figure 7B:
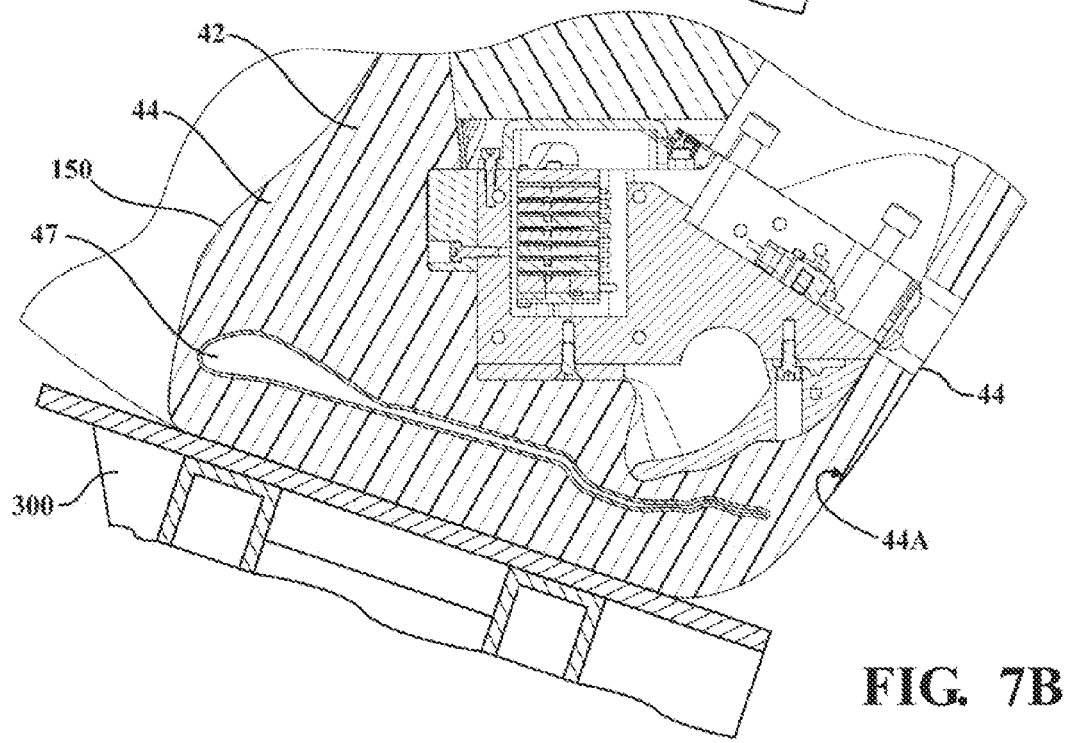
FIG. 7B is a side sectional view of FIG. 6B.
Figure 8:
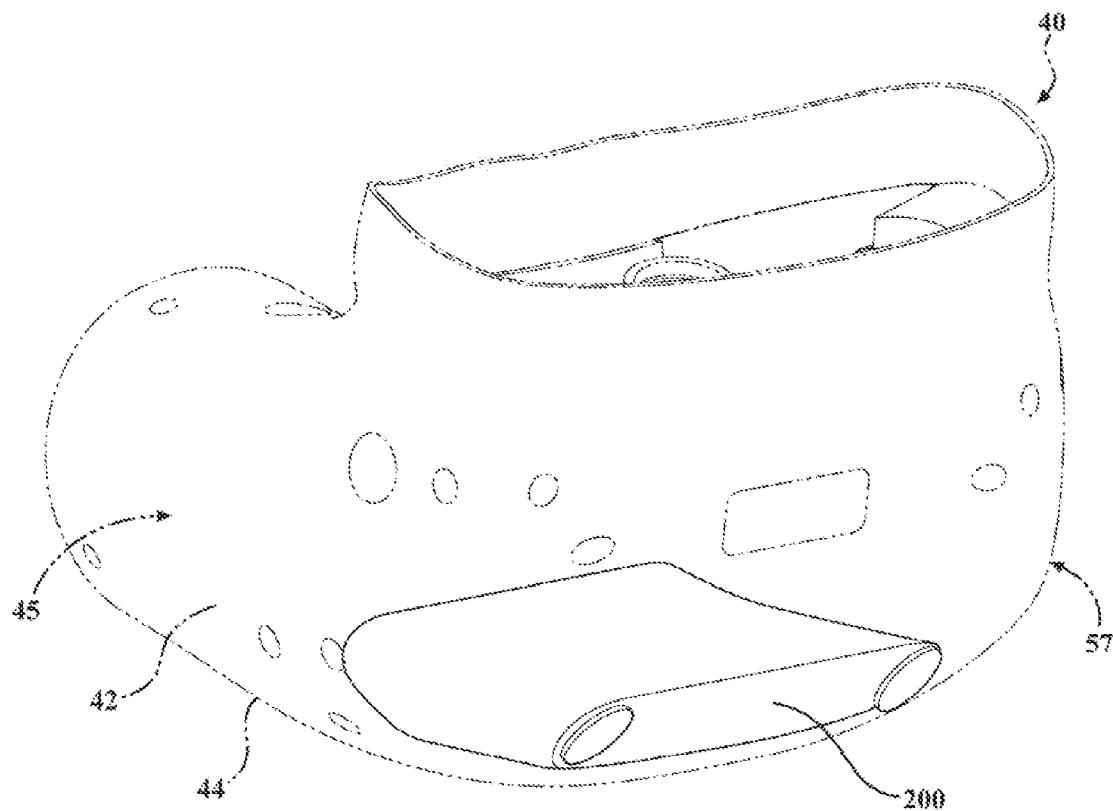
FIG. 8 is a perspective and transparent view of FIG. 4 prior to removal of a mold insert used to form the buttock cavity.

Referring now to FIGS. 6 and 7, the present invention introduces the buttock cavity 47, as described above, defined by the buttock region 57 of the pelvis member 40 that is sized and shaped to allow proper buttock compression of the buttock region 57 of the pelvis member 40 that simulates the response of a buttocks region of a human occupant seated upon the surface 300 (see FIGS. 6 and 7). When the anthropomorphic test device 10 is positioned onto the surface 300, the buttock cavity 47 is compressed from an open condition (see FIGS. 6A and 7A) to a collapsed condition (see FIGS. 6B and 7B), with the compression more closely approximating the force applied by the body weight of a human seated upon the surface 300 as compared with a pelvis member of similar size shape and formed from the same materials but not including the buttock cavity 47.

In certain embodiments, such as shown in FIGS. 6 and 7, the buttock cavity 47 is contained within the foam-containing cavity portion 45 and is entirely defined by the foam core 42 of the buttock region 57. In other words, the buttock cavity 47 is surrounded by the foam core 42 (other than where the vent ports 49 are located) and is spaced from the skin 44.

In certain alternative embodiments (not shown), the buttock cavity 47 is contained within the foam-containing cavity portion 45 but is partially defined by the foam core 42 and by an interior surface 44A of the skin 44. In other words, the buttock cavity 47 is surrounded by the interior surface 44A of the skin 44 towards the outside of the pelvis member 40 and the foam core 42 towards the interior of the pelvis member 40.

In either embodiment the buttock cavity 47 has a predefined width W1 and height H1, with the width W1 measured generally in a direction parallel to the length of the skin 44 located on the buttock region 57 that is positioned adjacent to the surface 300 and the height H1 measured in a direction normal to the width W1. The predefined height H1 factors in the normal compression of the buttock cavity 47 corresponding to the force applied by the body weight of the anthropomorphic test device 10 immediately prior to the anthropomorphic test device 10 being seated upon the surface 300. This predefined height H1 may alternatively be referred to as an open condition for the buttock cavity 47 represented in FIGS. 6A and 7A.

The buttock cavity 47 includes at least one vent port 49 (see FIG. 4) extending through the foam-containing cavity portion 45 to the skin 44. Stated another way, the buttock region 57 defines the buttock cavity 47 and also defines the at least one vent port 49. The skin 44 typically includes openings 51 that extend from the vent ports 49 (and thus the openings 51 may be considered an extension of the vent port 49 or are otherwise may be considered to be partially defined by the vent ports 49). Thus, the at least one vent port 49, alone or in conjunction with the respective openings 51, provides a passageway for air to travel to or from the buttock cavity 47 when seating the anthropomorphic test device 10 on the surface 300 or when removing the anthropomorphic test device 10 from the surface 300.

Figure 4:
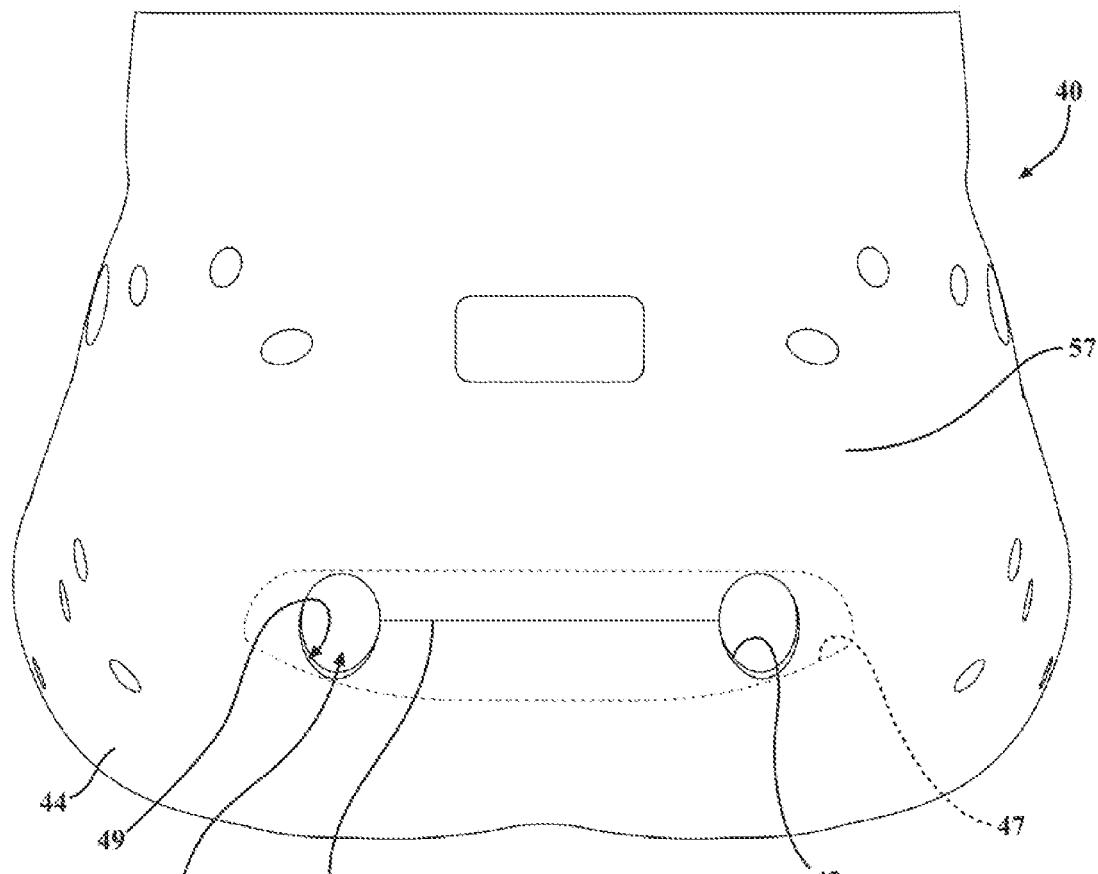
FIG. 4 is a rear view of the pelvis member of FIG. 2.
Figure 5:
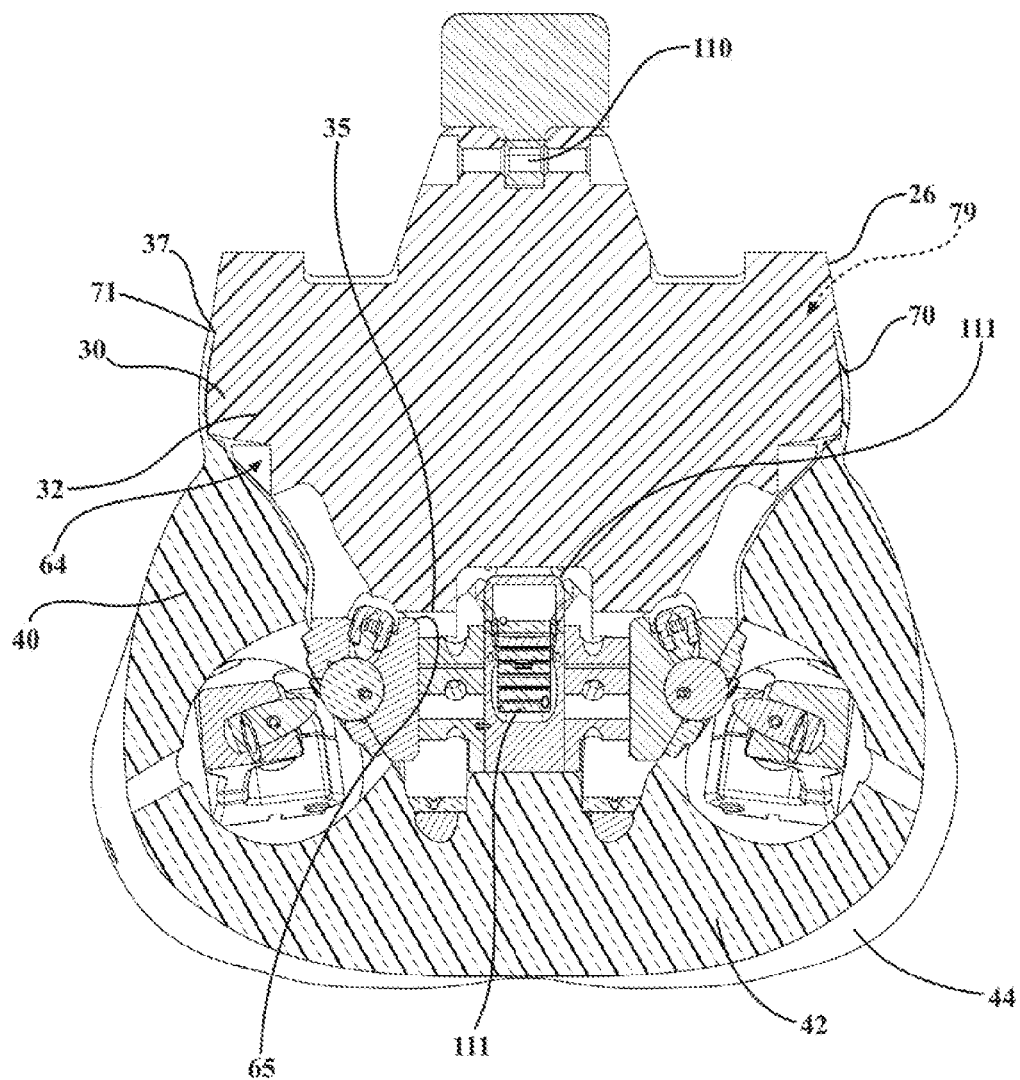
FIG. 5 is a sectional view of FIG. 3 taken along line 5-5 in accordance with the prior art.

While the at least one vent port 49 as illustrated in FIG. 4 are shown as being coordinated with the respective at least one opening 51 in the skin 44 and being open to the atmosphere surrounding the anthropomorphic test device 10, in other embodiments the at least one vent port 49 may be vented to the atmosphere in areas not covered by the skin 44 (and thus not through a respective opening 51). Still further, in other embodiments, the at least one vent port 49 may open internally to another region within the pelvis member 40 or internally within another region of the anthropomorphic test device 10 separate from the first cavity 64 that includes the pelvis support member 111 and may also include the thigh support structures 120, and not be open otherwise to the atmosphere surrounding the pelvis member 40 or the anthropomorphic test device 10.

In certain embodiments, such as shown in the FIG. 4, the buttock cavity 47 includes two vent ports 49 spaced apart from each other, with corresponding openings 51 extending from each respective one of the two vent ports 49 through the skin 44.

Figure 9B:
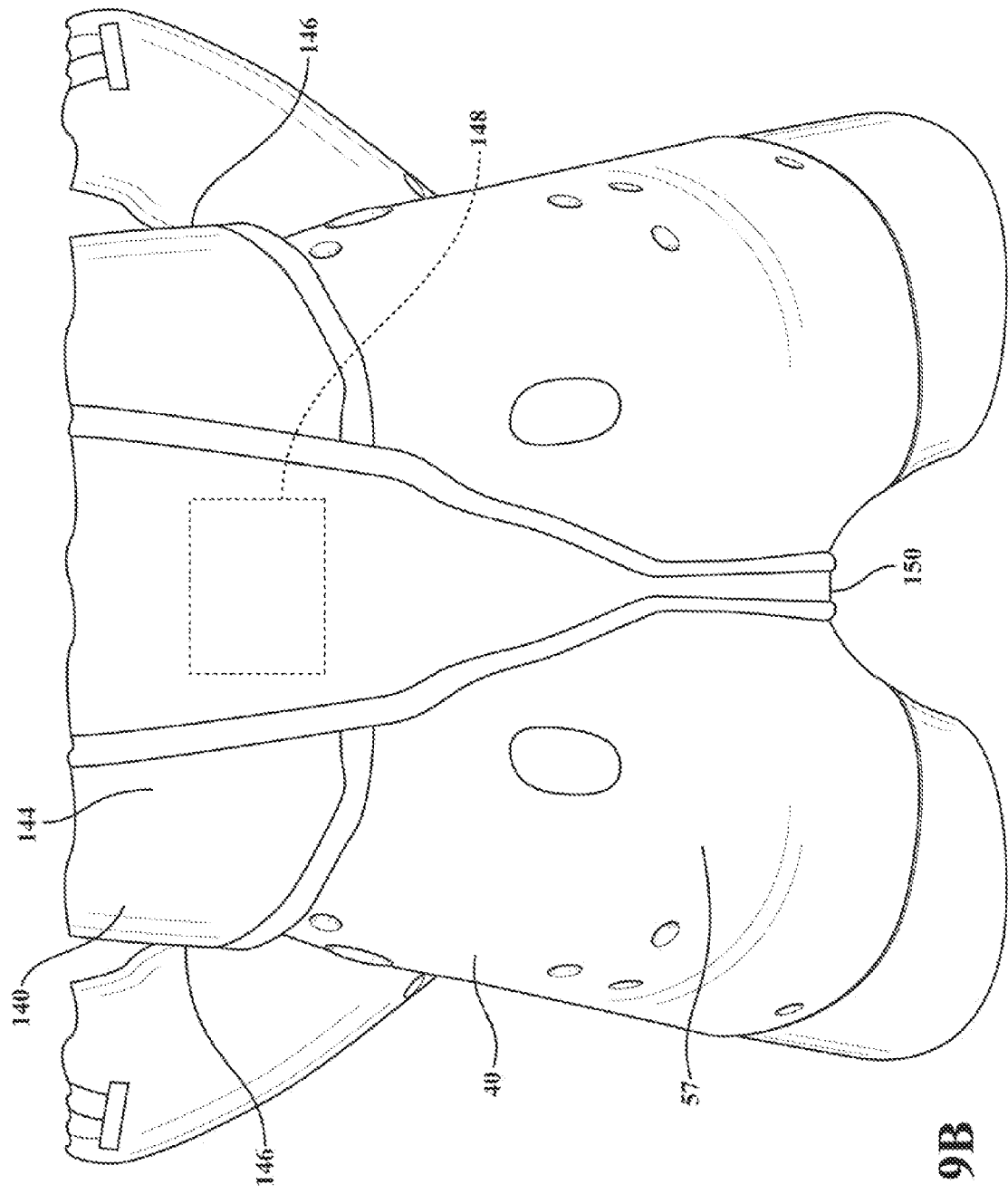
FIG. 9B is a rear view of FIG. 9A.

In certain embodiments, as best shown in FIGS. 9A and 9B, the anthropomorphic test device 10 may include a jacket 140 coupled around the pelvis member 40 that includes a front portion 142 that is positioned adjacent to a front of the pelvis member 40 and a rear portion 144 that is positioned adjacent to a rear of the pelvis member 40 and side portions 146 connecting the front and rear portion 142, 144. While not shown, and similar to a human jacket or shirt, the top portion of the jacket (not shown) is closed and is secured over the shoulders of the anthropomorphic test device 10 but includes a central opening through which the dummy head extends (and is attached to the spine) and arm openings adjacent the intersection of the top portion and side portions 146 through which the dummy arms extend (and are attached to the spine). The positioning of the jacket 140 onto the anthropomorphic device 10, in general, functions to maintain each of the components of anthropomorphic test device 10 between the head and legs in position prior to and during a subsequent collision impact test on the vehicle seat.

As also shown in FIGS. 6 and 7 in addition to being best shown FIGS. 9A and 9B, the jacket 140 includes a strap 150 that extends between the pair of thigh regions 52, 54 from the front portion 142 of the jacket 140 (see FIB 0.9A) to the rear portion 144 of the jacket 140 (see FIG. 9B). and which is coupled against and around the buttock region 57 of the pelvis member 40. The strap 150 as illustrated is stitched to the front portion 142 of the jacket 140 and is secured onto the back portion 144 of the jacket using a hook and loop fastener system (shown in phantom generically as 148). In alternative embodiments (not shown), the arrangement of the attachment of the strap 150 to the front portion 142 and rear portion 144 could be reversed, in which the strap 150 is sticked to the rear portion 14 and in which the hook and look fastening portion 148 secures the strap 150 to the front portion 142 of the jacket 140. Still further, as opposed to being stitched to other the front or rear portion 142, 144 of the jacket 140, the strap 150 could simply be an extension of the material of the front or rear portion 142, 144 of the jacket 140.

The strap 150, in any of the embodiments described above, functions to keep the pelvis member 40 properly positioned onto the surface 300 (as best shown in FIGS. 6B and 7B) to allow for the proper buttock compression of the pelvis member via the collapse of the buttock cavity 47 from the open condition to the collapsed condition (as described below) such that the anthropomorphic test device 10 closely simulates a human response during a subsequent collision impact test on the vehicle seat.

When the anthropomorphic test device 10 is positioned on the surface 300, the force caused by the weight of the anthropomorphic test device 10 downward onto the surface 300 through the buttock region 57 of the pelvis member 40 causes the buttock cavity 47 to compress from the open condition as shown in FIGS. 6A and 7A to the collapsed condition as shown in FIGS. 6B and 7B, with air escaping from the buttock cavity 47 through the at least one vent port 49 and, in certain embodiments, through the corresponding openings 51 in the skin 44, which remain open in the open condition and collapsed condition and in every operating condition between the collapsed condition and the open condition. Stated another way, the at least one vent port 49 remains open for flow of air in each of the open and collapsed conditions. In the collapsed condition, the width W1 is generally maintained as in the open condition, but the height of a portion, or the entirety of, the buttock cavity 47 is reduced from the height H1 to a height H2.

In certain embodiments during the collapsed condition, the height H2 of a portion, or the entirety of, the buttock cavity 47 may be reduced to zero, wherein the foam core 42 immediately above and immediately below the buttock cavity 47 along the respective portion or entirety are brought into contact with each other.

In certain alternative embodiments, the height H2 of a portion, or the entirety of, the buttock cavity 47 may be reduced but is greater than zero, wherein the foam core 42 immediately above and immediately below the buttock cavity 47 along the respective portion or entirety are not brought into contact with each other but wherein the distance between them is reduced.

When the anthropomorphic test device 10 is not seated on a surface 300, or where the pelvis member 40 is removed from the surface 300 or is otherwise not loaded by its own body weight or other form of loading force onto an object to which it is seated upon, the resiliency of the foam core 42 allows the pelvis member 40 to substantially return its normal shape (i.e., expand) when not seated upon the surface 300, which allows the buttock cavity 47 to return to the open condition having the height H1 (returning from the height H2) and with air returning to the buttock cavity 47 through the openings 51, when utilized, and through the vent ports 49 as the buttock cavity is expanded in height back towards H1 to aid in returning to the normal shape. The anthropomorphic test device 10 including the pelvis member 40 having the buttock cavity 47 may then be available for subsequent crash test simulations by being repositioned onto another surface 300 as desired (i.e., the anthropomorphic test device 10 is reusable).

The introduction of the buttock cavity 47 defined within the buttock region 57 of the pelvis member 40 allows the anthropomorphic test device 10 to approximate the seating height of the human pelvis more closely in a more representative position seated upon the surface of a vehicle seat with a lap belt being in contact with the pelvis and thigh as compared with pelvis members of similar size, shape, and construction but not including the buttock cavity (such as shown in FIG. 5). This may allow for improvements in the design of vehicles for safely transporting occupants and to protect occupants during particular types of crashes. In particular, the compression of the pelvis member 40 including the buttock cavity 47 and at least one vent port 49 to the collapsed position when seated upon the surface 300 more closely simulates the corresponding buttock compression of a human when seated onto the same surface 300 as compared to a pelvis member not including such features. Replicating the seat height, and hip joint height, can influence the ATD kinematics and submarining response of the pelvis to simulate a human response more closely, especially in reclined seating postures, which is popular with further autonomous vehicles ("AV"s).

The buttock cavity 47 is formed in conjunction with the formation of the pelvis member 40. In particular, a mold (not shown) is provided that is sized and shaped to correspond to the size and shape of the pelvis member 40. The mold includes an insert 200 (see FIG. 8) that is positioned within the cavity portion of the mold which is sized and shaped to correspond to the desired shape of the buttock cavity 47, including the vent ports 49 and openings 51.

To form the pelvis member 40 having the buttock cavity 47 in accordance with the subject invention, a "slush" molding process may be utilized. In this process, a mold (not shown) is provided that has an inner mold surface that is sized and shaped to correspond to the size and shape of the pelvis member 40. The mold includes the insert 200 that is sized and shaped and positioned to correspond to the size and shape of the buttock cavity 47, the at least one vent port 49 and the corresponding openings 51, with a portion of the insert 200 therefore in contact with the inner mold surface.

The mold is filled with a polymeric material used to form the skin 44, typically a vinyl polymer. The vinyl polymer is allowed to dwell for a sufficient period of time to cure along the outer mold surfaces to form the skin 44. The at least one opening 51 are created in the formed skin 44 during this step corresponding to portions of the insert that are in contact with the inner mold surface. The uncured polymeric material is removed, leaving the inner cavity portion 45 contained within the formed skin 44.

Next, a second polymeric material is injected within the mold and foamed to fill up the foam-containing cavity portion 45 to form the foam core 42. The mold is opened, and the pelvis member 40 including the insert 200 is removed from the mold. A slit or cut 202 (see FIG. 4) is introduced through the skin 44 and inner foam material 42, preferably between the vent ports 49 and openings 51, to access the insert 200, which is then removed through the slit 202. The slit 202 is sealed with adhesive or hot iron melt is used to remelt the foam core 42 corresponding to the slit 202 together after extracting the insert 200. The removed insert 200 thus leaves behind an open cavity that defines the buttock cavity 47 contained within the pelvis member 40 corresponding to the buttock region 57.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An anthropomorphic test device comprising:
   a pelvis member having a foam core, the pelvis member including:
      an abdomen region defining a first cavity,
      a pair of thigh regions extending from the abdomen region, and
      a buttock region positioned below the abdomen region and rearward of the pair of thigh regions, the buttock region defining a buttock cavity separate from the first cavity with the buttock region also defining at least one vent port,
   a structural member positioned within the first cavity; and
   wherein the buttock cavity compresses from an open condition to a collapsed condition when the anthropomorphic test device is placed onto a surface.

2. The anthropomorphic test device of claim 1, wherein air escapes from the buttock cavity through the at least one vent port as the buttock cavity compresses from the open condition to the collapsed condition.

3. The anthropomorphic test device of claim 1, wherein the buttock cavity expands from the collapsed condition to the open condition when the anthropomorphic test device is removed from placement onto the surface.

4. The anthropomorphic test device of claim 3, wherein air enters the buttock cavity from the at least one vent port as the buttock cavity expands from the collapsed condition to the open condition.

5. The anthropomorphic test device of claim 1, wherein the buttock cavity has a width W1 and a height H1 in the open condition, with the height H1 reduced to a height H2 in the collapsed condition.

6. The anthropomorphic test device of claim 5, wherein the width W1 is generally maintained in each of the collapsed condition and the open condition.

7. The anthropomorphic test device of claim 1, wherein each of the pair of thigh regions define an opening coupled to the first cavity.

8. The anthropomorphic test device of claim 7 further comprising an additional structural member positioned within each of the openings of the pair of thigh regions, with each of the additional structural members coupled to the structural member positioned within the first cavity.

9. The anthropomorphic test device of claim 1, wherein the at least one vent port comprises two vent ports spaced from each other.

10. The anthropomorphic test device of claim 1, wherein the at least one vent port remains open for flow of air in each of the open and collapsed conditions.

11. The anthropomorphic test device of claim 1 further comprising a jacket coupled to the anthropomorphic test device with said jacket including a strap coupled around the buttock region of the pelvis member.

12. A pelvis member for use in an anthropomorphic test device, the pelvis member having a foam core and including:
   an abdomen region defining a first cavity,
   a pair of thigh regions extending from the abdomen region, and
   a buttock region positioned below the abdomen region and rearward of the pair of thigh regions, the buttock region defining a buttock cavity separate from the first cavity with the buttock region also defining at least one vent port,
   wherein the buttock cavity compresses from an open condition to a collapsed condition when the pelvis member is placed onto a surface.

13. The pelvis member of claim 12, wherein air escapes from the buttock cavity through the at least one vent port as the buttock cavity compresses from the open condition to the collapsed condition.

14. The pelvis member of claim 12, wherein the buttock cavity expands from the collapsed condition to the open condition when the anthropomorphic test device is removed from placement onto the surface.

15. The pelvis member of claim 14, wherein air enters the buttock cavity from the at least one vent port as the buttock cavity expands from the collapsed condition to the open condition.

16. The pelvis member of claim 12, wherein the buttock cavity has a width W1 and a height H1 in the open condition, with the height H1 reduced to a height H2 in the collapsed condition.

17. The pelvis member of claim 16, wherein the width W1 is generally maintained in each of the collapsed condition and the open condition.

18. The pelvis member of claim 12, wherein each of the pair of thigh regions define an opening coupled to the first cavity.

19. The pelvis member of claim 12, wherein the at least one vent port remains open for flow of air in each of the open and collapsed conditions.

20. A method of use of an anthropomorphic test device having a pelvis member when the anthropomorphic test device is placed upon a surface, with the pelvis member including an abdomen region and a pair of thigh regions extending from the abdomen region, the pelvis member also including a buttock region positioned below the abdomen region and rearward of the pair of thigh regions, the buttock region defining a buttock cavity separate from the first cavity, with the buttock region also defining at least one vent port, and with the buttock cavity having a height H1 and a width W1 in an open condition;
   said method comprising the steps of:
   placing the anthropomorphic test device onto the surface; and
   compressing the buttock cavity from the open condition to a collapsed condition with the height H1 reduced to a height H2 when the anthropomorphic test device is placed onto the surface.

21. The method of claim 20, further including the step of expanding the buttock cavity from the collapsed condition to the open condition when the anthropomorphic test device is subsequently removed from placement onto the surface.

* * * * *